(12) United States Patent
Calandrini et al.

(10) Patent No.: US 9,222,807 B2
(45) Date of Patent: Dec. 29, 2015

(54) METHOD AND DEVICE FOR PRODUCTION OF A MAGNETIC POSITION OR PATH SENSOR ELEMENT

(75) Inventors: Patrick Calandrini, Ludwigsburg (DE); Thomas Kitzing, Jena (DE); Goetz Eberle, Eisenach (DE); Marcel Spoerl, Borna (DE)

(73) Assignee: ROBERT BOSCH GMBH, Stuttgart (DE)

( * ) Notice: Subject to any disclaimer, the term of this patent is extended or adjusted under 35 U.S.C. 154(b) by 287 days.

(21) Appl. No.: 13/387,995

(22) PCT Filed: Jun. 10, 2010

(86) PCT No.: PCT/EP2010/058159
§ 371 (c)(1),
(2), (4) Date: Apr. 18, 2012

(87) PCT Pub. No.: WO2011/012367
PCT Pub. Date: Feb. 3, 2011

(65) Prior Publication Data
US 2012/0194182 A1    Aug. 2, 2012

(30) Foreign Application Priority Data
Jul. 29, 2009 (DE) .......... 10 2009 028 093

(51) Int. Cl.
*G01B 7/14* (2006.01)
*G01D 5/245* (2006.01)
*G01D 18/00* (2006.01)

(52) U.S. Cl.
CPC .......... *G01D 5/2451* (2013.01); *G01D 18/002* (2013.01)

(58) Field of Classification Search
CPC .......... G01D 18/002; G01D 5/2451
USPC .......... 324/207.12, 207.2–207.25
See application file for complete search history.

(56) References Cited

U.S. PATENT DOCUMENTS 5,793,201 A    8/1998  Nelle et al.
5,909,115 A    6/1999  Kano et al.
(Continued)

FOREIGN PATENT DOCUMENTS

CN    1973182       3/2007
DE    203 02 273    4/2003
(Continued)

OTHER PUBLICATIONS

International Search Report, PCT International Application No. PCT/EP2010/058159, dated Sep. 7, 2010.

*Primary Examiner* — Jay Patidar
(74) *Attorney, Agent, or Firm* — Kenyon & Kenyon LLP

(57) ABSTRACT

A method is provided for producing a magnetic position or path sensor element, the magnetic position or path sensor element having at least one magnetic pathway that extends along a displacement path and that has a plurality of magnetic north-south transitions, as well as at least one magnetic sensor mounted so as to be movable relative to the magnetic pathway. At least one of the magnetic north-south transitions is defined as a critical north-south transition whose position is to be detected with a specified degree of precision. Adjacent to the critical north-south transition are situated magnetic poles having identical polarity. The method provides production reliability by reducing the sensitivity of the magnetic position or path sensor element to positional tolerances.

4 Claims, 2 Drawing Sheets

(56) References Cited

U.S. PATENT DOCUMENTS

| | | | |
|---|---|---|---|
| 5,945,824 A | 8/1999 | Obara et al. | |
| 7,948,230 B2* | 5/2011 | Shiao | 324/207.24 |
| 2004/0066187 A1* | 4/2004 | Schroter et al. | 324/207.22 |
| 2004/0174161 A1* | 9/2004 | Tausch et al. | 324/207.22 |
| 2009/0009160 A1* | 1/2009 | LaCroix | 324/207.25 |
| 2011/0309824 A1* | 12/2011 | Takahashi et al. | 324/207.13 |
| 2013/0063138 A1* | 3/2013 | Takahashi et al. | 324/207.25 |

FOREIGN PATENT DOCUMENTS

| | | |
|---|---|---|
| GB | 2 034 053 | 5/1980 |
| GB | 2 114 755 | 8/1983 |
| GB | 2 356 049 | 5/2001 |
| WO | 2005/124288 | 12/2005 |

* cited by examiner separate sensors control unit carriage 152

METHOD AND DEVICE FOR PRODUCTION OF A MAGNETIC POSITION OR PATH SENSOR ELEMENT

FIELD OF THE INVENTION

The present invention relates to magnetic sensor elements that can be used for example as linear position sensors and/or path sensors. In particular, the present invention relates to the production of an optimized multipole geometry for magnetic linear position and path sensors. Such magnetic sensor elements can for example be used in automotive technology, in particular as linear position and/or path sensors in automatic transmissions. In various areas of the natural sciences and technology, the recognition of a relative position and/or positioning between two elements that are mounted so as to be movable relative to one another is required. In the following, example embodiments of the present invention are described substantially with reference to position sensors for transmission controlling, for example in automatic transmissions, in which positions of an actuating element (for example of a selector lever shaft, of a selector slide, or of a parking lock cylinder) are to be detected relative to the housing or to some other fixed element. Such position sensors may be used individually and may also be integrated into electronics modules. Position sensors that can also be modified in the present context are described for example in Robert Bosch GmbH, "Sensoren im Kraftfahrzeug," ed. 2007, pp. 136-137. However, other applications are also possible in principle.

BACKGROUND INFORMATION

For position recognition, in many cases sensors are used that operate according to the Hall sensor principle. For example, for this purpose application-specific integrated circuits (ASICs) can be used as magnetic sensors that, in addition to one or more sensors, for example Hall sensors, can also include an electronics system, for example an electronics system that processes or pre-processes the signals of the sensors. The sensitive elements in the sensors, or the ASICs, are as a rule excited by a movable multipolar permanent magnet, also called an encoder. The signal in the ASICs is generated by the pole transition of the magnetic field (transition from north to south or transition from south to north, referred to hereinafter as a north-south transition without limitation of the direction of transition). The encoder is moved by a coupling with an entraining piece, for example the above-named selector lever. The detection of the position of the encoder by the ASICs is the function of the magnetic sensor element.

For example, in an automatic transmission that is switched manually, the position sensor detects the position of the selector lever and/or selector slide, for example the positions P, R, N, D, S, as well as the intermediate regions, and outputs these to a transmission control device in the form of a code, for example a 4-bit code. For reasons of safety, the coding of the position is as a rule carried out in one step, i.e. two bit changes are always required for the recognition of a new position. The required magnetic field curve (pole transition) is provided to the sensitive elements by the encoder for the correct signal output. However, in the case of a geometrical displacement relative to a specified nominal position, due for example to positional tolerances, distortions of the pole transitions due to the mutual influence of the magnetic poles can cause a deviation of the measured position signal. In order to ensure sufficient sensor precision, the positioning of the slide in all three spatial directions relative to the sensitive elements of the ASICs must have narrow tolerances.

As a rule, the positional tolerances between the sensitive elements and the encoder are a consequence of assembly and/or component tolerances. Thus, a tolerance chain of these tolerances includes for example the positioning of Hall elements inside an ASIC, the positioning of the Hall ASIC in the sensor package, a positioning of the sensor package with respect to a reference point in the overall system, the positioning of the sensor package relative to the encoder, and the positioning of the encoder relative to the entraining element, for example the selector lever (measurement object). However, this tolerance chain represents a considerable challenge for the manufacturing tolerances that are to be realized. This can result in high reject rates and a high economic expense for reject reduction.

SUMMARY

Therefore, a method for producing a magnetic sensor element and a magnetic sensor element are described herein that at least significantly avoid the challenges and disadvantages of known magnetic sensor elements and production methods. Example embodiments of the present invention provide a suitable design of the multipole geometry of the magnetic encoder, which can bring about a significant reduction in the sensitivity of the magnetic sensor element to positional tolerances between the encoder and sensitive elements of the Hall ASICs. In this manner, an increased production reliability can be achieved, and the requirements of precision in the overall assembly process of the magnetic sensor element can be greatly reduced.

Example embodiments of the present invention are based on the recognition that the precision with which a north-south transition of the encoder can be detected is able to be strongly influenced by the magnetic poles situated immediately adjacent to the north-south transition. Correspondingly, according to example embodiments of the present invention it is provided that particularly critical north-south transitions in the magnetic multipole geometries of the encoder be fashioned such that the magnetic environment of these northsouth transitions enables an optimized detection.

A corresponding method is provided for producing a magnetic sensor element. For example, as presented above, the magnetic sensor element can be arranged as a position and/or path sensor, for example as a linear position and/or path sensor. For further possible example embodiments, reference is made to the above description, which can be modified according to example embodiments of the present invention.

The magnetic sensor element includes at least one magnetic pathway that extends along a displacement path. A displacement path should be understood as a path stretch along which at least two elements of the magnetic sensor element that are mounted so as to be movable relative to one another can move relative to one another. For example, these two elements mounted movably relative to one another can be an entraining element—for example, a selector lever, a selector slide, or a parking lock cylinder—and a housing that are movable relative to one another, the position of these elements relative to one another defining for example a switching setting, in particular a switching setting of an automatic transmission. The displacement path can in particular be made linear, but in principle curved displacement paths can also be provided.

The magnetic pathway, which can extend along the entire displacement path and/or only along parts of this displacement path, and which can also include a plurality of contiguous or non-contiguous partial paths, includes a plurality of magnetic north-south transitions. As explained above, the designation of the north-south transition is not limited to a transition from a magnetic north pole to a magnetic south pole, but rather also includes transitions in the converse direction, so that for example in a direction of movement a magnetic north pole can follow a magnetic south pole, or vice versa. Thus, in the sense of the above description, the magnetic pathway is a magnetic encoder or a part of a magnetic encoder.

In addition, the sensor element includes at least one magnetic sensor that is mounted so as to be movable relative to the magnetic pathway. The magnetic sensor can for example be fastened to the entraining element, and the magnetic pathway can be fastened to a housing of the magnetic sensor element, or vice versa. The movable mounting can for example take place by a carriage or a conventional movable bearing. Here, a magnetic sensor should be understood in principle as any sensor capable of detecting a magnetic field with respect to its magnitude and/or its direction. In particular, the magnetic sensor can be a Hall sensor, but in principle other conventional magnetic sensor measurement may also be used. The magnetic sensor can for example include one or more sensor elements. If for example a plurality of magnetic pathways are provided, at least one separate sensor element can be provided for each of these magnetic pathways. In addition, as described above, the magnetic sensor can also include a control and/or evaluation electronics unit, for example in an integrated circuit. Correspondingly, the magnetic sensor can be fashioned completely or partly as an ASIC, for example as an ASIC that also includes one or more or all of the named sensor elements.

In the production method, at least one of the north-south transitions is defined as a critical north-south transition whose position is to be detected with an increased degree of precision. In this sense, "critical" thus refers to an increased requirement with regard to the detection of the position of a north-south transition. For example, this critical north-south transition can be a transition whose detection for example brings about a changeover from a parked state into a driving state of a motor vehicle. However, other cases are also possible in which a north-south transition can be defined as a critical north-south transition. In particular, this definition can be a definition specified by a customer and/or user of a particularly critical north-south transition. For example, the magnetic pathway can include at least three north-south transitions, at least two of the north-south transitions being defined as critical north-south transitions.

According to example embodiments of the present invention, in order to increase the precision of the detection of the critical north-south transition it is provided to optimize the magnetic environment of this critical north-south transition. Correspondingly, in the method, adjacent to the critical north-south transition there are situated magnetic poles having identical polarity. This means that in a dimension perpendicular to the longitudinal extension of the magnetic path, i.e. perpendicular to the displacement path, adjacent to the critical north-south transition there are situated magnetic poles having identical polarity, i.e. for example north poles on both sides or south poles on both sides. These poles having identical polarity can for example be part of separate magnetic elements that are preferably situated immediately adjacent to the critical north-south transition. For example, the poles having identical polarity can be situated at a distance of less than half the width of the magnetic pathway, i.e. of the extension of the magnetic pathway perpendicular to the displacement path, preferably immediately adjoining the magnetic pathway.

The magnetic poles having identical polarity can for example be, as described above, part of individual magnetic elements situated adjacent to the critical north-south transition. Alternatively, the magnetic poles can however be part of additional magnetic pathways that extend parallel to the magnetic pathway and that each have at least one magnetic pole. For example, the additional magnetic pathway can be a magnetic pathway having at least one north-south transition. To this extent, example embodiments of the present invention can for example also be used in the complex, multipath multipole systems as described above, in which a plurality of magnetic pathways, for example three, four, or more magnetic pathways, are provided, corresponding to the storage depth of the specified bit pattern. For example, multipole systems can be provided that can include for example 3, 4, 5 or more magnetic pathways.

The additional magnetic pathways can for example be used exclusively for the purpose of the magnetic optimization of the environment of the critical north-south transition. Such additional magnetic pathways are also referred to as dummy magnetic pathways hereinafter. Their magnetic poles, for example their magnetic north-south transition or transitions, are not detected by the magnetic sensor. Correspondingly, at least one of the additional magnetic pathways can be fashioned as a magnetic pathway such that at least one magnetic pole thereof is not detected by the magnetic sensor. For example, dummy magnetic pathways can have at least one north-south transition that is at least not specifically sought out and detected by the magnetic sensor with the aim of recognizing this north-south transition. According to this aspect, in addition to the method a magnetic sensor element is provided for detecting at least one relative position between two elements that are mounted so as to be movable relative to one another, in particular for use in an automatic transmission that can in particular be capable of being produced, in a method according to an example embodiment of the present invention, in one of the exemplary embodiments described above or in the following. The magnetic sensor element has at least one magnetic pathway extending along a displacement path, the pathway having a plurality of magnetic north-south transitions and at least one magnetic sensor mounted so as to be movable relative to the magnetic pathway. At least one of the magnetic north-south transitions is defined as a critical north-south transition whose position is to be detected with a specified degree of precision. Adjacent to this critical north-south transition are situated magnetic poles having identical polarity that are part of additional magnetic pathways, each having at least one north-south transition, extending parallel to the magnetic pathway. Here it is proposed to arrange at least one of the additional magnetic pathways as a dummy magnetic pathway having at least one magnetic pole, for example at least one north-south transition, which however is not detected by the magnetic sensor.

Alternatively or in addition to the arrangement of one or both of the additional magnetic pathways as a dummy magnetic pathway, a design of the method or of the sensor element is however also possible in which one or both of the additional magnetic pathways is also used for the detection and/or the coding of the bit pattern. Correspondingly, the method can be designed such that the north-south transitions of at least one, preferably both, of the additional magnetic pathways are also detected by the magnetic sensor, for example by separate sensor elements of the magnetic sensor.

As described above, using the north-south transitions of the magnetic pathway and of the additional magnetic pathways it is possible for example to specify a defined bit pattern along the displacement path. The magnetic sensor can have separate sensors for the magnetic pathway and for at least one of the additional magnetic pathways, preferably for all additional magnetic pathways. In this manner, the named bit pattern can be detected by the separate sensors by traveling along the displacement path.

Because in this example embodiment at least one of the additional magnetic pathways is simultaneously used as an information carrier and as an optimization of the magnetic environment of the critical north-south transition, in some circumstances there can result a conflict in goals in the realization of the north-south transitions of this additional magnetic pathway. In order, therefore, to create a greater degree of freedom with regard to the configuration of this additional magnetic pathway, in order to meet the named conditions on the realization of this additional magnetic pathway, it is provided to use the possibility of an inversion of the north-south transitions of this at least one additional magnetic pathway. In this manner, on the one hand the described bit content of this additional magnetic pathway can be ensured, and on the other hand it can be ensured that the magnetic pole, adjacent to the critical north-south transition, of this additional magnetic pathway has the desired polarity. For this purpose, it is provided that the magnetic sensor that detects the north-south transitions of the magnetic pathway and of the additional magnetic pathways have separate sensors for the magnetic pathway and for at least one of the additional magnetic pathways. The signal of at least one sensor can here be inverted. The signal of a sensor for at least one additional magnetic pathway and/or the signal of a sensor for the actual magnetic pathway can here be inverted. This inversion can for example take place through a logical inversion and/or through other types of electronic inverters or software-implemented inverters. For example, the inversion can take place in an ASIC, for example the Hall ASIC of the magnetic sensor. In this manner, through corresponding inversions it is possible to resolve the above-described conflict of goals, in which both the magnetic environment of the critical north-south transition is optimized and also a certain information content must be contained in the additional magnetic pathway.

The specified degree of precision with which the position of the critical north-south transition must be detected can be specified in various manners. For example, this precision can be defined by an absolute position of a zero crossing of a magnetic signal that characterizes the transition. Alternatively or in addition, the precision can also be defined for example by an increase in the magnetic signal. For example, this increase can be defined by a change of a magnetic signal by at least a specified amount within a specified maximum stretch along the displacement path. The change in the magnetic signal can for example be specified by a concrete sensor element, for example a sensor IC (for example an application-specific integrated circuit or ASIC). The stretch along the displacement path can for example be specified via requirements on the sharpness of the switching point of the overall sensor, and can be determined for example by a tolerance chain.

As described above, the critical north-south transition can for example be specified by customer requirements. It is particularly preferred if the critical north-south transition is allocated to a switching transition in an automatic transmission that moves from a park setting to a non-park setting. Thus, the critical north-south transition can for example be allocated to one or more of the following switching transitions in an automatic transmission: a transition from a park setting P to an intermediate setting Z1; a transition from a neutral setting N to an intermediate setting Z2 or an intermediate setting Z3; a transition from a reverse setting R to an intermediate setting Z1 or an intermediate setting Z2. These transitions, which in practice must be detected with a particularly high degree of precision in order in particular to avoid accidents, can in this manner be detected particularly reliably, so that the automatic transmission can be realized particularly safely.

Overall, using the method and the proposed magnetic sensor element, methods and sensor elements can be realized considerably more economically. At the same time, the reject rates can be greatly reduced with a comparatively low outlay for reject reduction. Future, more stringent market requirements on the measurement precision of the magnetic sensor elements can easily be realized through the example embodiments described herein.

Exemplary embodiments of the present invention are shown in the drawings and are explained in more detail in the accompanying description.

DETAILED DESCRIPTION

In the following, example embodiments of the present invention are described with reference to a position sensor as described for example in the above-mentioned publication by Robert Bosch GmbH: "Sensoren im Kraftfahrzeug," ed. 2007, pp. 136-137. Correspondingly, reference is made to this publication with regard to the possible arrangements of the magnetic sensor element. Example embodiments of the present invention relate only to the arrangement of the multipole system of the magnetic encoder of the position sensor.

Figure 1A:
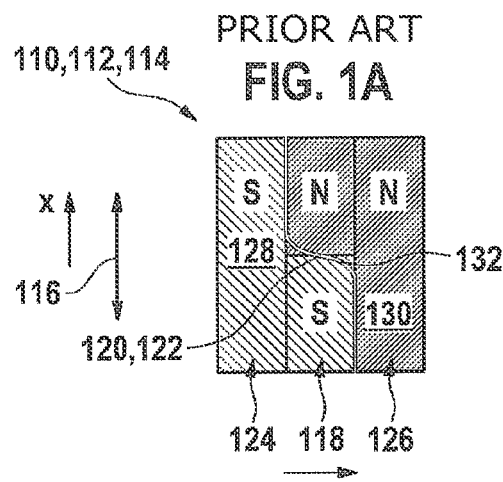
FIGS. 1A and 1B show a conventional arrangement and an arrangement according to an example embodiment of the present invention of the magnetic environment of the north-south transition.
Figure 1B:
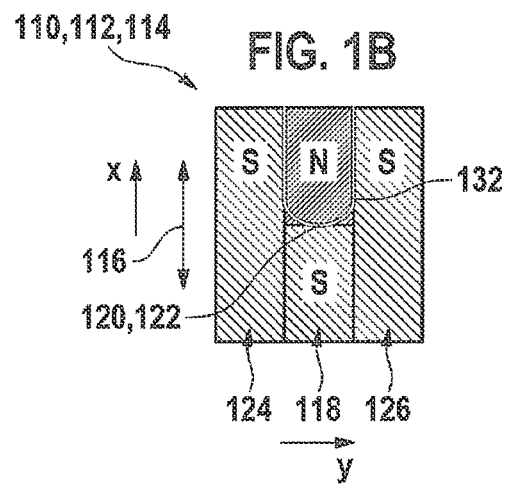

FIGS. 1A and 1B show segments of a multipole system 110 of a magnetic encoder 112 of a magnetic sensor element 114. FIG. 1A shows a part of a conventional multipole system 110, whereas FIG. 1B shows an arrangement according to an example embodiment of the present invention of this multipole system 110. In the depicted exemplary embodiment, multipole system 110 has a magnetic pathway 118 that extends along a displacement path 116. In general, in the Figures magnetic north poles are designated N, while magnetic south poles are designated S. Magnetic pathway 118 has a plurality of north-south transitions 120, of which only one is shown in FIGS. 1A and 1B. Let it be assumed that this depicted north-south transition is a critical north-south transition 122 whose position along displacement path 116 is to be detected with a specified degree of precision by a magnetic sensor not shown in the Figures, for example with a higher degree of precision than at least one additional north-south transition 120 of magnetic pathway 118.

FIG. 1A shows a conventional multipole system 110 in which the environment of critical north-south transition 122 has been arranged randomly, in that it is surrounded by additional magnetic pathways 124, 126 that have magnetic poles 128, 130 having opposite polarity situated adjacent to critical north-south transition 122. Thus, additional magnetic pathway 124 at the left has a magnetic south pole at critical north-south transition 122, whereas additional magnetic pathway 126 at the right has a magnetic north pole at a critical north-south transition.

In FIGS. 1A and 1B, the dimension parallel to displacement path 116 is designated x, whereas the dimension perpendicular to this displacement path 116 is designated y. Furthermore in FIGS. 1A and 1B a curve 132 is shown that characterizes the change in the magnetic field strength as a function of the coordinate y, i.e. as a function of the position perpendicular to displacement path 116. It follows from this curve that in the system shown in FIG. 1A having the asymmetrical realization of magnetic poles 128, 130, the pole transition likewise extends asymmetrically, and the width of the magnetic pole is very strongly distorted. The absolute magnitude of the deviation from a target value, given a deviation from a center position inside magnetic pathway 118, thus fluctuates comparatively strongly. Thus, due to the strong asymmetry of the pole transition represented by curve 132, a lateral displacement can cause a significant displacement in the resulting switching point.

In contrast, FIG. 1B shows a multipole system 110 in which critical north-south transition 122 is surrounded at both sides by magnetic poles 128, 130 having identical polarity. In this case, the two magnetic poles 128, 130 are realized as south poles, but a realization as north poles is also possible. Here again, in FIG. 1B the change in the pole transition 132 as a function of the y coordinate is shown symbolically by curve 132. It will be seen that in the example embodiment according to the present invention having three magnetic poles of the same type, situated in a U shape around a counterpole, in which this functionally relevant transition forms a curve in the shape of a letter "U," curve 132 of the pole transition distorts the pole transition significantly less over the width of the magnetic pole. Due to the symmetry of the pole transition, the possible area of displacement of the switching point is also significantly reduced. Due to the symmetrical situation of magnetic poles 128, 132 around critical north-south transition 122, in this manner a minimization can be achieved of the geometric distortion of the pole transition, and the insensitivity of the measurement system to the positional tolerances between the encoder and a magnetic sensor can be increased by up to a factor of 5, depending on the installation space.

Figure 2A:
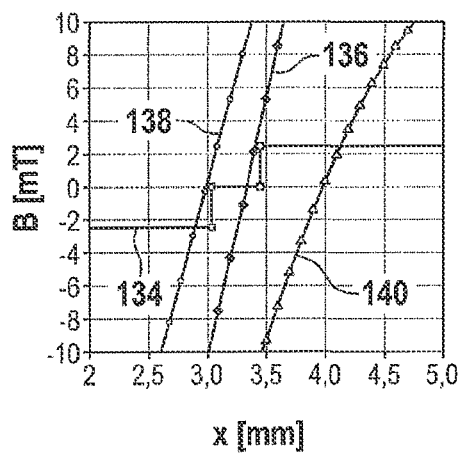
FIGS. 2A and 2B show measurement curves of the magnetic field strength along the displacement path for a conventional north-south transition and for a conventional north-south transition.
Figure 2B:
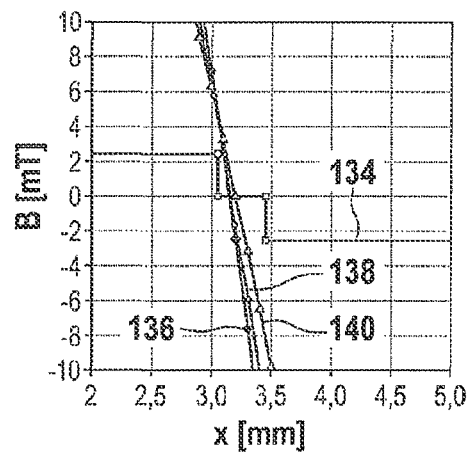

FIGS. 2A and 2B show magnetic field measurements at real north-south transitions 120 for a conventional multipole system 110 and a multipole system 110 according to example embodiments of the present invention. The measurements were carried out on a magnetic pathway 118 having a width of 3.3 mm. In each case, magnetic field strength B is shown as a function of the x coordinate in mm along displacement path 116.

First, in both Figures a target curve 134 is shown as an example. This target curve shows that between the beginning and the end of the switching point the magnetic field strength must run through both magnetic switching thresholds of the magnetic sensor in order to trigger a switching process. The beginning and ending of the switching point (location coordinate x) and the switching thresholds of the magnetic sensor (magnetic field B) thus form the target curve. In addition, in each of the Figures a curve 136 is shown that indicates the magnetic field curve for an assumed track center in magnetic pathway 118. In addition, curves 138, 140 are shown that show the magnetic field curve for a displacement in the y direction of −1.25 mm (curve 138) and for a displacement by +1.25 mm (curve 140).

The comparison of the critical north-south transition 122 illustrated in FIG. 2A with that illustrated in FIG. 2B shows that, given economically producible positional tolerances of the permanent magnet of multipole system 110 relative to the magnetic field sensor, the target curve of the magnetic flux density according to the specifications cannot be maintained, or can be maintained only with difficulty. Thus, curves 138 and 140 of magnetic flux density B lie outside the target curve in the realization shown in FIG. 2A. In contrast, in the optimized design shown in FIG. 2B, with economically producible positional tolerances the target curve of magnetic flux density B according to specifications can be maintained. All curves 136, 138, and 140 lie within target curve 134.

Additional magnetic pathways 124, 126, which provide magnetic poles 128, 130 in the area of critical north-south transition 122, can, individually or both, be realized either as dummy magnetic pathways 118 without usable information content or, individually or both, can also be used as information carriers. The latter case is shown in FIGS. 3A and 3B, FIG. 3A again showing a conventional design and FIG. 3B showing an optimized design. Shown is a segment of a multipole system 110 in which, arbitrarily, the second path has been designated from below as magnetic pathway 118, and the other magnetic pathways have been designated as additional magnetic pathways 124, 126, and 142. Finally, however, all magnetic pathways 118, 124, 126, and 142, with their north-south transitions 120, can act as information carriers, for example in order to form a bit pattern along displacement path 116, shown horizontally in FIGS. 3A and 3B. In the depicted bit pattern, for example one of the north-south transitions 120 of magnetic pathway 118 can be defined as critical north-south transition 122, for example because the switching process associated with this north-south transition 122 is safety-relevant. For example, the detected switching process can be a transition from a park setting P to an intermediate setting Z1, and/or a transition from a neutral setting N to an intermediate setting Z2 or an intermediate setting Z3, and/or a transition from a reverse setting R to an intermediate setting Z1 or an intermediate setting Z2.

As follows from the bit pattern of the conventional multipole system 110 in FIG. 3A, in the conventional situation of the multipole geometry all pole transitions except one are made asymmetrical. Critical north-south transition 122, which has the narrowest tolerance range, is however here at the same time the transition having the largest asymmetry.

Figure 3A:
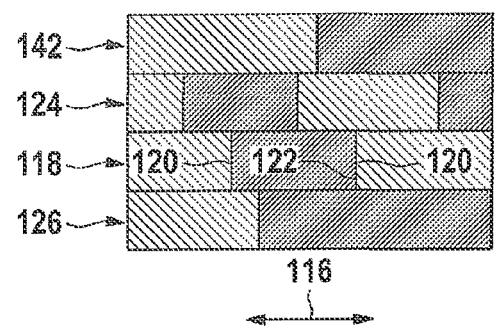
FIGS. 3A and 3B show a conventional arrangement and an arrangement according to an example embodiment of the present invention of a magnetic multipole.
Figure 3B:
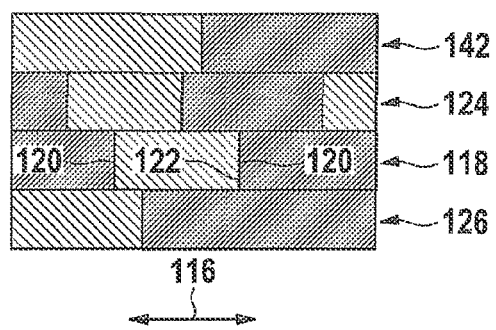

FIG. 3B shows a modification according to an example embodiment of the present invention of the bit pattern according to FIG. 3A. Here, magnetic pathways 118 and 124 are inverted relative to the system shown in FIG. 3A. In order nonetheless to represent the same bit pattern as in FIG. 3A, the signals of the associated sensor elements, which detect magnetic pathways 118 and 124, can for example be inverted. Through the inversion of the magnetic poles on the two inner pathways 118, 124, all north-south transitions 120 of these pathways except one are made symmetrical. In particular, the pole transition defined as critical north-south transition 122 has in this embodiment the sharpest north-south transition.

Figure 4:
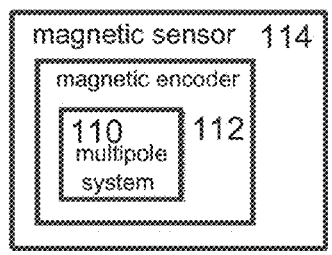
FIG. 4 shows a magnetic sensor according to an example embodiment of the present invention.

FIG. 4 shows a magnetic sensor according to an example embodiment of the present invention. The magnetic sensor includes the multipole system 110, which is shown in detail in FIG. 1B. The magnetic sensor further includes the magnetic encoder 112 of the magnetic sensor element 114.

Figure 5:
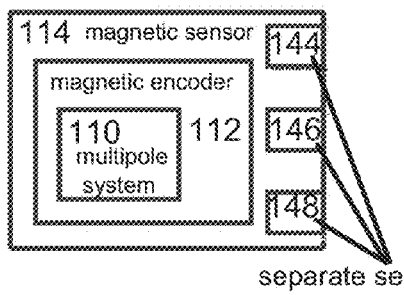
FIG. 5 shows a magnetic sensor having separate sensors according to an example embodiment of the present invention.

FIG. 5 shows a magnetic sensor having separate sensors according to an example embodiment of the present invention. The magnetic sensor 114 of FIG. 5 includes separate sensors 144, 146, and 148. Magnetic sensor 114 has a separate sensor 144 for the magnetic pathway 118 and separate sensors 146 and 148 for at least one of the additional magnetic pathways 124, 126, and 142

Figure 6:
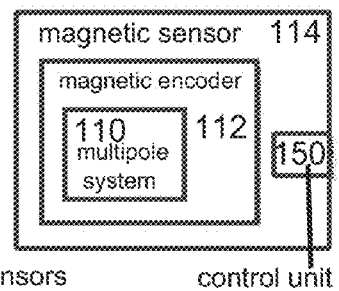
FIG. 6 shows a magnetic sensor having a control unit according to an example embodiment of the present invention.

FIG. 6 shows a magnetic sensor having a control unit according to an example embodiment of the present invention. Here, magnetic sensor includes control unit 150.

Figure 7:
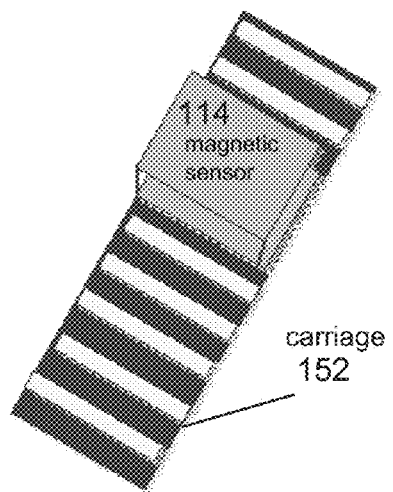
FIG. 7 shows a magnetic sensor movably mounted by a carriage according to an example embodiment of the present invention.

FIG. 7 shows a magnetic sensor movably mounted by a carriage according to an example embodiment of the present invention. The magnetic sensor 114 is movably mounted by a carriage 152.

The realization of additional magnetic pathways 124, intended to optimize the magnetic field environment of critical north-south transition 122, in the form of additional magnetic pathways 124, 126, 142, which also act as information carriers, is a realization that is particularly efficient with regard to constructive space. Here, additional magnetic pathways 124, 126, 142 are no longer simply dummy pathways, but are themselves information carriers that, in a double function, provide the suitable magnetic field environment for critical north-south transition 122. A possible alternative to this is to provide intermediate pathways each of which is inverted relative to the sensor pathways, but which require larger constructive space. In this alternative embodiment, for example all, or some, of magnetic pathways 118, 124, 126, and 142 could be surrounded by dummy pathways, each providing, in the area of north-south transitions 120, or at least in the area of the at least one critical north-south transition 122, suitable magnetic poles 128, 130 having identical polarity on both sides of critical north-south transition 122. However, this embodiment has the disadvantage of requiring larger constructive space.

What is claimed is:

1. A magnetic sensor element for detecting at least one relative position between two elements mounted so as to be movable relative to one another, comprising:
   at least one magnetic pathway that extends along a displacement path and that has at least three magnetic north-south transitions;
   at least one magnetic sensor mounted so as to be movable relative to the magnetic pathway;
   wherein at least two of the magnetic north-south transitions are detected and defined as critical north-south transitions in that the position of the critical north-south transition along the displacement path detected with a specified higher degree of precision relative to a degree of precision with which at least one further north-south transition of the at least one magnetic pathway is detected, magnetic poles having identical polarity being situated in a direction perpendicular to the displacement path, on both sides of the critical north-south transition and directly adjacent to the critical north-south transition, the magnetic poles being part of additional magnetic pathways that extend parallel to the magnetic pathway and have at least one north-south transition, at least one of the additional magnetic pathways being read out via a further sensor, and the magnetic pathways encoding a predefined bit pattern.

2. The magnetic sensor element according to claim 1, wherein an output signal of the at least one magnetic sensor is inverted for at least one of the additional magnetic pathways.

3. The magnetic sensor element according to claim 1, wherein the critical north-south transitions are allocated to one or more of the following switching transitions in an automatic transmission: a transition from a park setting P to an intermediate setting Z1; a transition from a neutral setting N to an intermediate setting Z2 or an intermediate setting Z3; a transition from a reverse setting R to an intermediate setting Z1 or an intermediate setting Z2.

4. The magnetic sensor element according to claim 1, wherein the magnetic sensor element is for use in an automatic transmission.

* * * * *